(12) United States Patent
Chan (10) Patent No.: US 10,916,887 B2
(45) Date of Patent: Feb. 9, 2021

(54) PLUG CONNECTOR HAVING A HOUSING MODULE WITH TWO HOUSINGS INTERLOCKED BY DEFORMED TONGUE HAVING TWO LEGS

(71) Applicant: FOXCONN INTERCONNECT TECHNOLOGY LIMITED, Grand Cayman (KY)

(72) Inventor: Seng-Kum Chan, Santa Clara, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 16/406,029

(22) Filed: May 8, 2019

(65) Prior Publication Data

US 2020/0358224 A1 Nov. 12, 2020

(51) Int. Cl.
| H01R 13/629 | (2006.01) |
| H01R 13/627 | (2006.01) |
| H01R 13/512 | (2006.01) |
| G02B 6/42   | (2006.01) |

(52) U.S. Cl.
CPC ..... *H01R 13/62927* (2013.01); *H01R 13/512* (2013.01); *H01R 13/6275* (2013.01); *H01R 13/62988* (2013.01); *G02B 6/4261* (2013.01)

(58) Field of Classification Search
CPC .......... H01R 13/5025; H01R 13/62927; H01R 13/5045; H01R 13/512; H01R 43/04
USPC .................................................. 439/352, 372
See application file for complete search history.

(56) References Cited

U.S. PATENT DOCUMENTS

| 7,322,845 | B2 * | 1/2008 | Regnier | H01R 13/6275 |
| | | | | 439/352 |
| 7,387,527 | B2 * | 6/2008 | Kim | G02B 6/4201 |
| | | | | 439/372 |
| 7,416,433 | B1 * | 8/2008 | Wu | G02B 6/4246 |
| | | | | 439/160 |
| 7,429,185 | B1 * | 9/2008 | Wu | H01R 13/6275 |
| | | | | 439/372 |
| 8,011,948 | B2 * | 9/2011 | Wu | H01R 13/6275 |
| | | | | 439/358 |
| 8,035,975 | B2 * | 10/2011 | Wu | H01R 13/6335 |
| | | | | 361/727 |
| 8,251,733 | B2 * | 8/2012 | Wu | H01R 13/512 |
| | | | | 439/160 |
| 8,475,197 | B2 * | 7/2013 | Zerebilov | H01R 13/6275 |
| | | | | 439/352 |
| 8,545,252 | B2 * | 10/2013 | Wang | H01R 13/6275 |
| | | | | 439/352 |
| 8,556,646 | B2 | 10/2013 | Kappla et al. | |

(Continued)

*Primary Examiner* — Abdullah A Riyami
*Assistant Examiner* — Marcus E Harcum
(74) *Attorney, Agent, or Firm* — Wei Te Chung; Ming Chieh Chang (57) ABSTRACT

A plug connector includes: a housing module having a mating end and including a first housing and a second housing assembled with the first housing to define a cavity therebetween; and a mating board received in the cavity and exposed to an exterior at a position close to the mating end; wherein the first housing has a main portion and a tongue extending from the main portion, the second housing has a receiving space receiving the tongue, and the tongue is deformed to latch within the receiving space.

11 Claims, 6 Drawing Sheets

(56) References Cited

U.S. PATENT DOCUMENTS

| | | | | |
|---|---|---|---|---|
| 8,740,637 B2* | 6/2014 | Wang | ............... | H01R 13/6335 |
| | | | | 439/352 |
| 8,787,025 B2* | 7/2014 | Wu | ............... | H01R 13/6275 |
| | | | | 361/740 |
| 8,851,906 B2* | 10/2014 | Wu | ............... | H01R 13/6581 |
| | | | | 439/607.45 |
| 8,961,196 B2* | 2/2015 | Wu | ............... | H01R 13/6658 |
| | | | | 439/76.1 |
| 9,263,829 B2* | 2/2016 | Wu | ............... | H01R 13/6271 |
| 9,263,831 B2* | 2/2016 | Shen | ............... | H01R 13/6272 |
| 9,774,113 B2* | 9/2017 | Zhang | ............... | H01R 12/594 |
| 9,891,386 B2* | 2/2018 | Little | ............... | G02B 6/3817 |
| 10,317,633 B2* | 6/2019 | Yu | ............... | G02B 6/4206 |
| 10,511,126 B2* | 12/2019 | Shimizu | ............. | H01R 13/6315 |
| 2007/0123090 A1 | 5/2007 | Kim | | |
| 2012/0058651 A1* | 3/2012 | Wang | ............... | H01R 13/6275 |
| | | | | 439/76.1 |
| 2013/0077919 A1* | 3/2013 | Zong | ............... | G02B 6/4228 |
| | | | | 385/89 |
| 2014/0193993 A1* | 7/2014 | Meng | ............... | H01R 13/633 |
| | | | | 439/352 |
| 2018/0034211 A1* | 2/2018 | Little | ............... | H01R 13/642 |

* cited by examiner

PLUG CONNECTOR HAVING A HOUSING MODULE WITH TWO HOUSINGS INTERLOCKED BY DEFORMED TONGUE HAVING TWO LEGS

BACKGROUND OF THE INVENTION

1. Field of the Invention

The present invention relates, generally, to a plug connector, and more particularly, to a plug connector using a new way of holding two housings.

2. Description of Related Arts

Typical plug connector module for transmitting optical signal usually has two halves of housing. These housings are usually made of metallic materials for their thermal conductivity. The two housings are usually held together by mechanical screws that require some type of locking system (e.g., Loctite thread locker epoxy) to prevent them from working back out. However, the screws are costly in terms of piece parts, and it requires a precision tool and operator labour to put on screws. The small screws tend to strip or damage easily; once damaged, it is difficult to fix. In view of the trend of connector miniaturization, the screws take up precious internal real estate of the module.

U.S. Pat. No. 8,556,646 discloses a plug connector having a mating end including a top housing, a bottom housing assembled with the top housing, and two screws assembled with the two housings near an end opposite to the mating end. The top housing includes a tongue disposed near the mating end. The bottom housing includes a channel receiving the tongue. The top housing is held with the bottom housing through the screws and the tongue. The tongue is not clamped with the channel.

Thereof, there is a need to improve the plug connector.

SUMMARY OF THE INVENTION

An object of the present invention is to provide a plug connector using a new way of holding two housings.

To achieve the above-mentioned object, a plug connector comprises: a housing module having a mating end and including a first housing and a second housing assembled with the first housing to define a cavity therebetween; and a mating board received in the cavity and exposed to an exterior at a position close to the mating end; wherein the first housing has a main portion and a tongue extending from the main portion, the second housing has a receiving space receiving the tongue, and the tongue is deformed to latch within the receiving space.

According to the present invention, the two housings are assembled by the tongue being latched within the receiving space. It does not need extra cost because the features are part of the housing. Through a simple process and operation, it can be automated very easily. It doesn't take up any space from internal space of the module. It also can be used for temper proof; if someone were to open the module, there will be clear sign of damage to the tongues.

DETAILED DESCRIPTION OF THE PREFERRED EMBODIMENT

Figure 1:
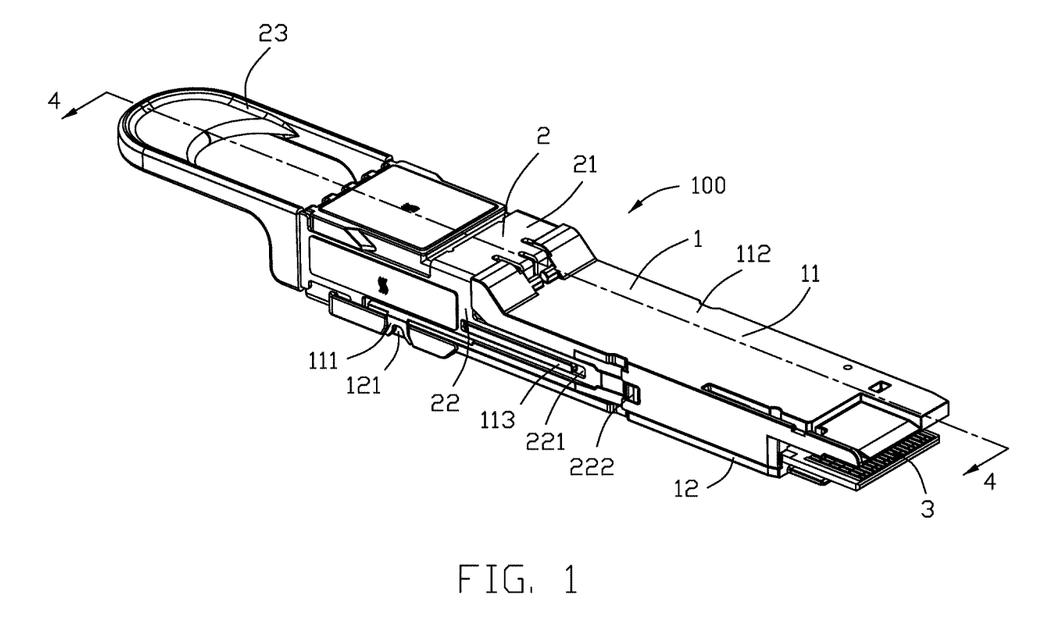
FIG. 1 is a perspective view of a plug connector in accordance with present invention.
Figure 2:
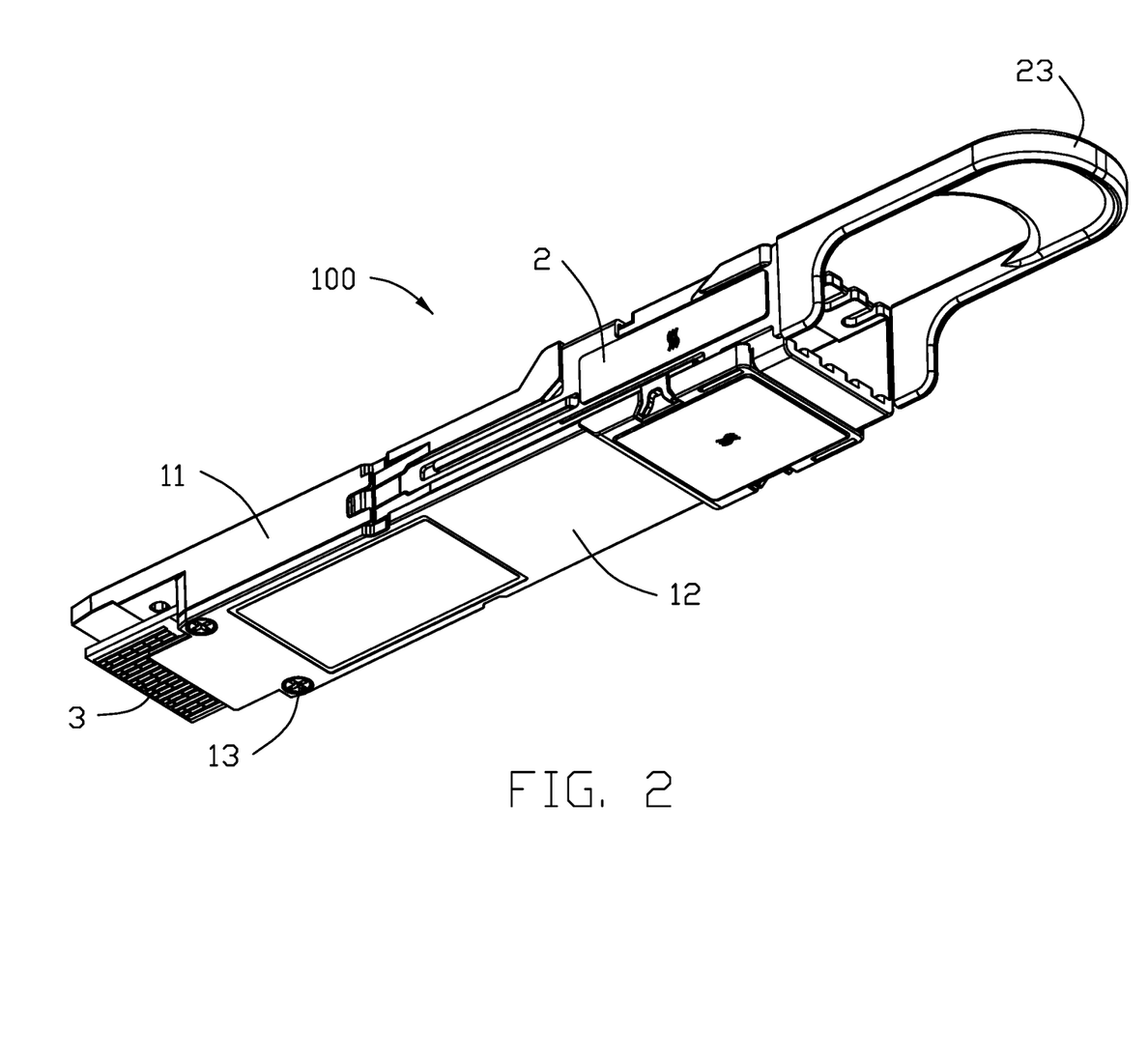
FIG. 2 is a perspective view of the plug connector as shown in FIG. 1, but from a different perspective.
Figure 3:
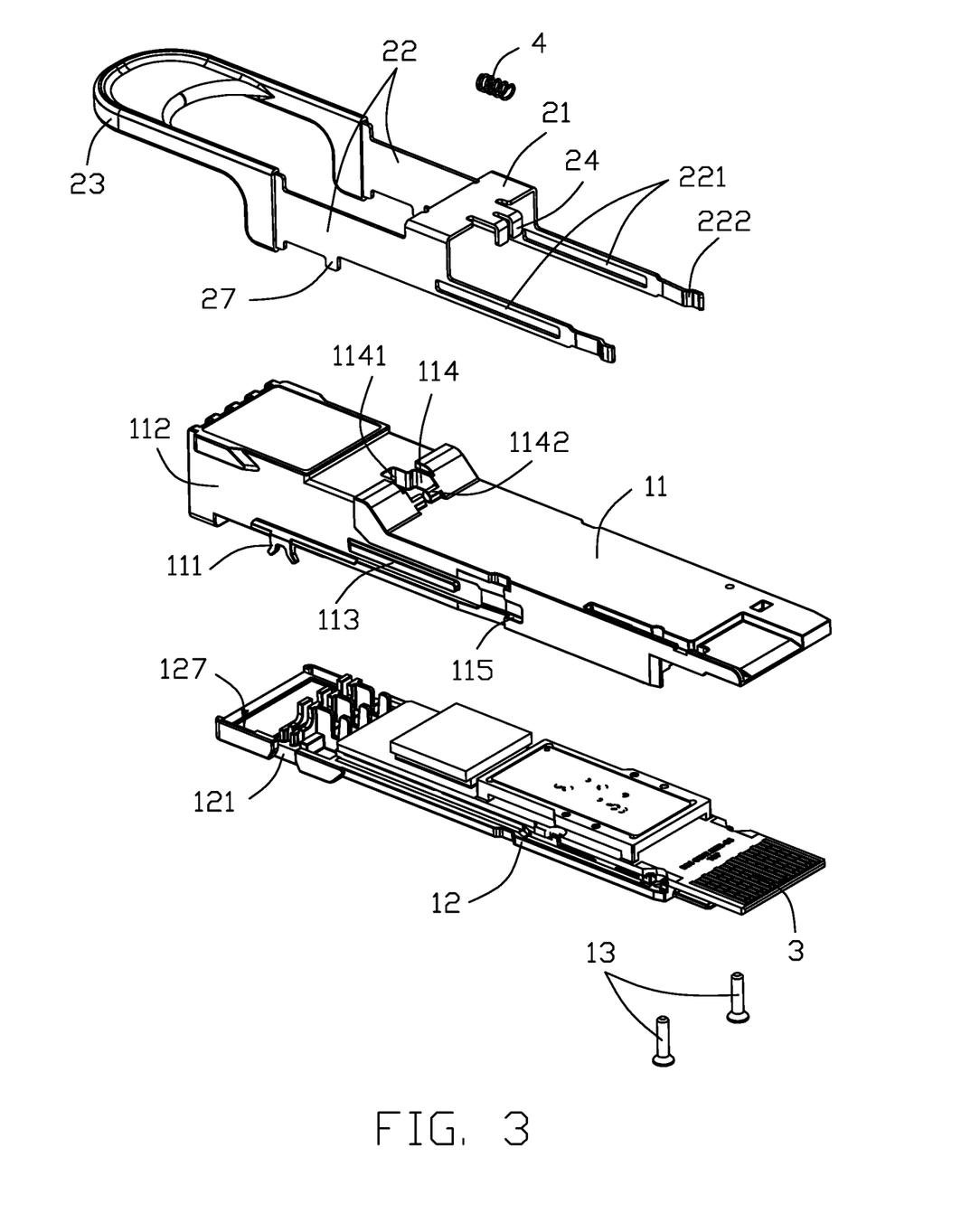
FIG. 3 is an exploded view of the plug connector as shown in FIG. 1.

Reference will now be made in detail to a preferred embodiment of the present invention. Referring to FIGS. 1-3, a plug connector 100 includes a housing module 1 made of a metallic material having a mating end in a front-to-back direction, and including a cavity therein, a printed circuit board or mating board 3 disposed within the cavity for mating with a mating connector, and an unlocking member 2 assembled on the housing module 1. The mating board 3 is received in the cavity and exposed to exterior at the position close to the mating end.

The housing module 1 includes a first housing 11, a second housing 12 assembled with the first housing 11 in a vertical direction perpendicular to the front-to-back direction to define the cavity, and a pair of screws 13 disposed near the mating end assembled with the two housings 11, 12. The first housing 11 includes a main portion 112, a tongue 111 extending from the main portion 112, a receiving space 114 disposed on the main portion, and a spring 4 received in the receiving space 114.

Figure 4:
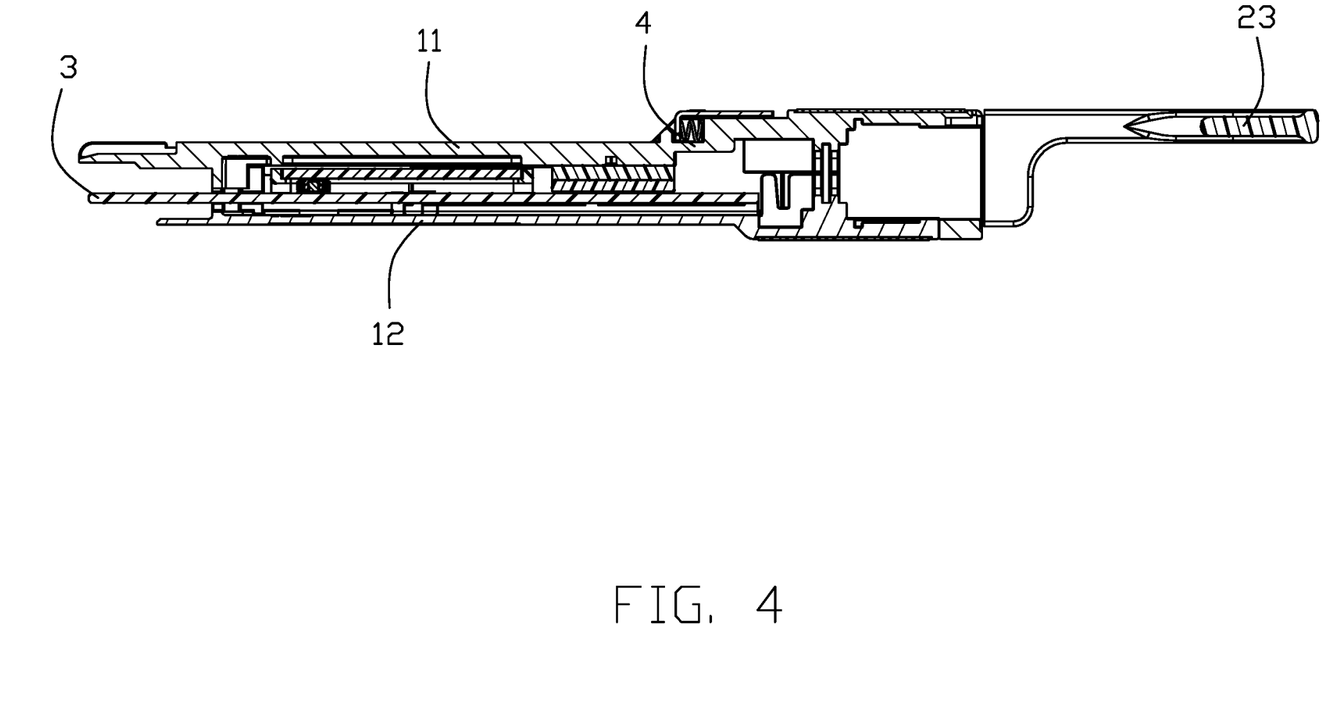
FIG. 4 is a cross-sectional view of the plug connector taken along line 4-4 in FIG. 1.

The unlocking member 2 includes a body portion 21, a pair of extending portions 22 extending from two opposite ends of the body portion 21, a plate 24 extending downward from the body portion 21, and a tail portion 23 connected with the two extending portions. The first housing 11 includes a guide block 113 disposed thereon and a stage 115 disposed on the same side of the guide block 113 that mated with the mating connector to lock the mating connector and the plug connector. The extending portion 22 includes a guide rail 221 sleeved out the guide block 113, and a protuberance 222 disposed near the stage 115. When pulling the tail portion 23, the unlocking member 2 moves along the guide rail 221 and is limited by the guide block 113, and then the protuberance 222 unlocks the locking situation at the place of the stage 115. Also referring to FIG. 4, the receiving space 114 includes a rear wall 1141 and a front wall 1142 opposite to the rear wall 1141. One end of the spring 4 is against the rear wall 1141, and the other end of the spring 4 is against the plate 24. The plate 24 is against the front wall 1142 by the spring force of the spring 4. When the unlocking member 2 moves, the spring 4 is pressed by the plate 24, and the plate 24 leaves the front wall 1142. When releasing the tail portion 23, the unlocking member 2 returns to the previous situation by the spring force.

Figure 5:
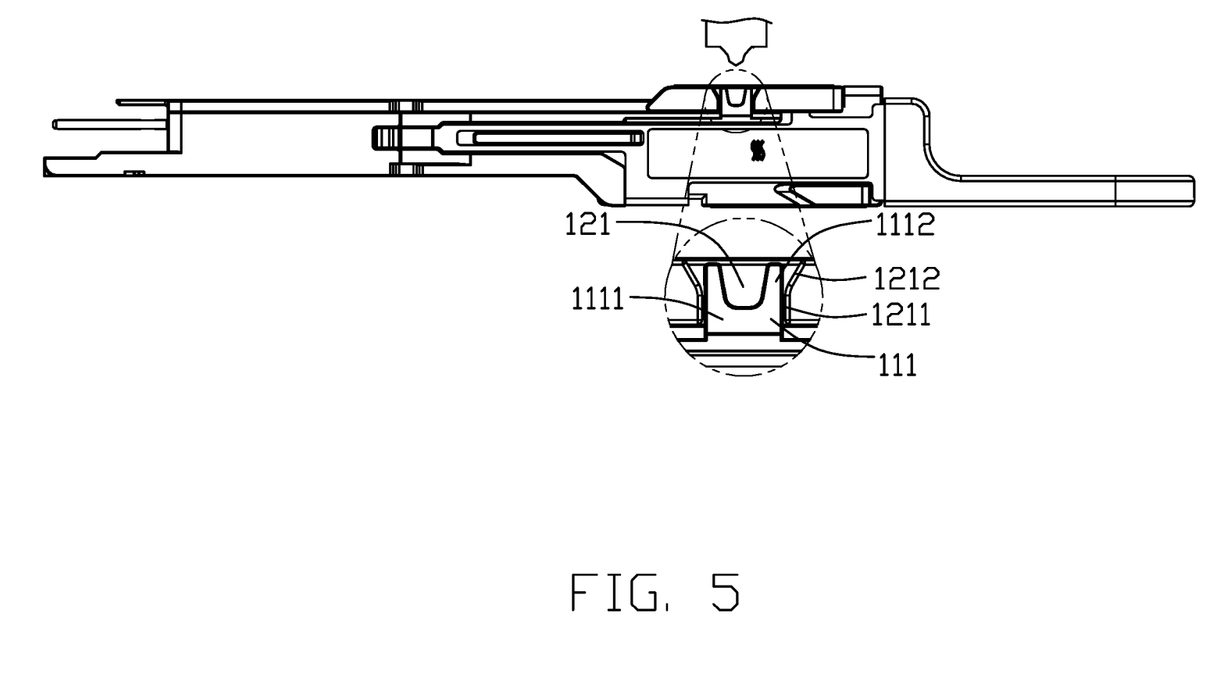
FIG. 5 is a side view of the plug connector as shown in FIG. 1 before a mechanical process.
Figure 6:
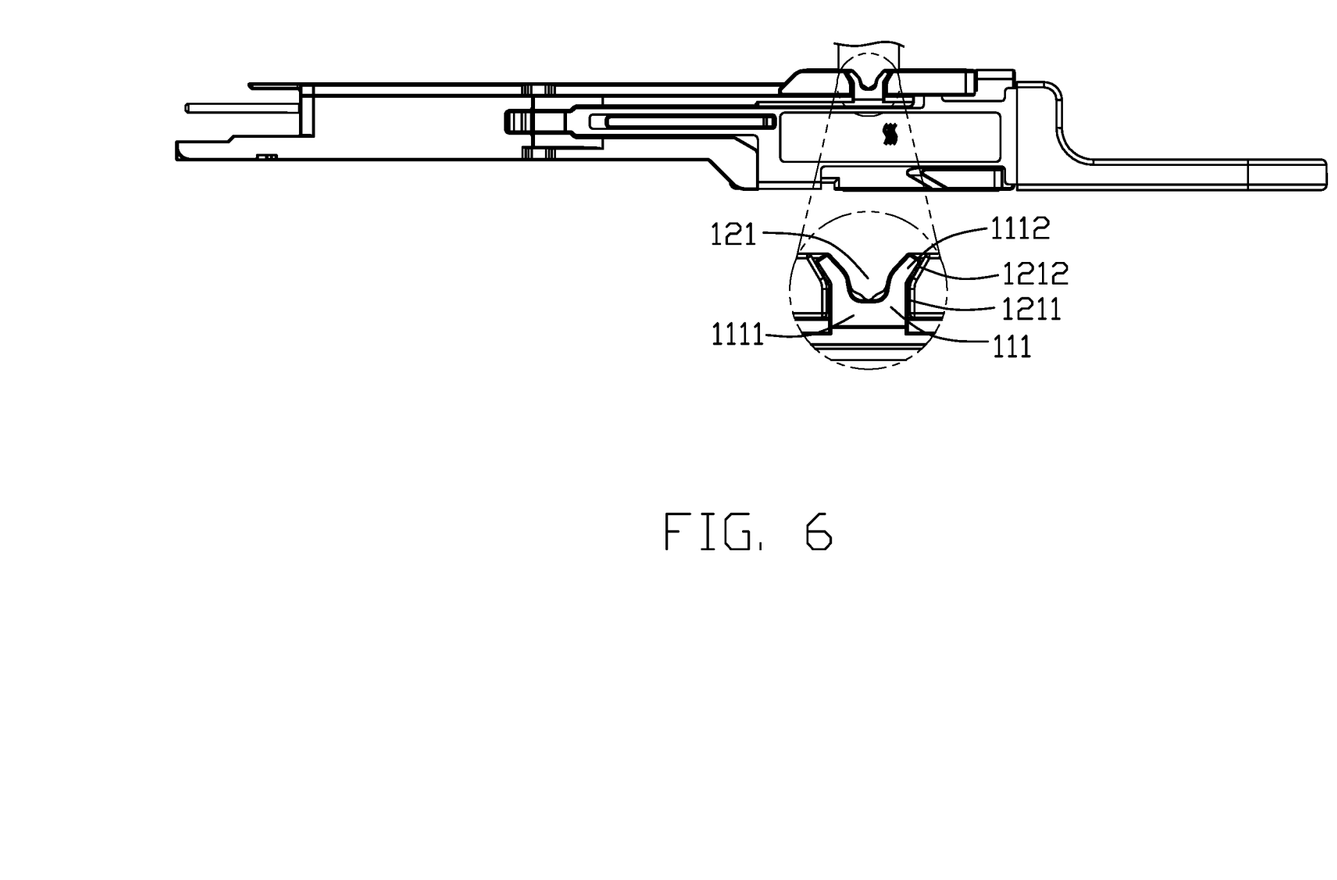
FIG. 6 is a side view of the plug connector as shown in FIG. 1 after the mechanical process.

Referring to FIGS. 5 and 6, the tongue 111 includes a base portion 1111 and two legs 1112 apart from each other extending from the base portion 1111. The second housing 12 includes a receiving space 121 receiving the tongue 111. The receiving space 121 includes a first part 1211 and a second part 1212. A distance between two opposite edges of the first part 1211 is shorter than a distance between two opposite edges of the second part 1212. When assembling the first housing and the second housing, the tongue 111 inserts into the receiving space 121 along a vertical direction, then an exterior tool inserts between the two legs 1112, and the two legs 1112 are spread away from each other in the front-to-back direction and against the edge of the receiving space 121 by the pressure of the exterior tool, so that a distance between the two legs 1112 in the first part is shorter than a distance between the two legs 1112 in the second part. In this way, the first housing 11 is latched with the second housing 12. In this embodiment, the tongue 111 and the receiving space 121 are disposed near an end of the housing module 1 opposite to the mating end.

In this embodiment, both the first housing 11 and the second housing 12 are made via a related formation method of one of metal injection or metal die casting or powder metal sintering or even forging, etc., so as to have both the first housing 11 and the second housing 12 rigid enough. In other words, each of the first housing 11 and the second housing 12 has corresponding various thicknesses not only for complying with the required configurations but also for performing a basic strength resisting any undesired external impact. Thus, the tongue 111 is not resilient but inherently rigid as well so that any disassembling action upon the housing 12 by resuming the tongue 111 back to its original position, i.e., the straight format, may inevitably jeopardize the divergent configuration/structure of the deformed legs 1112. In this embodiment, the tongue 111 is sidewardly/laterally/outwardly exposed to an exterior for easy operation/deformation. Alternately, the tongue 111 may not be sidewardly exposed to the exterior but being hidden behind an exterior face of the side wall (not labeled) of the second housing 12. Notably, each face of both the first housing 11 and the second housing 12 are essentially complete without openings derived from forming corresponding parts for assuring complete shielding effect. Understandably, the legs 1112 are deformed away from each other in the front-to-back direction so as to be intimately and compliantly seated upon the opposite edges of the second part 1212 so as to assure reliable securement between the first housing 11 and the second housing 12. In this embodiment, the unlocking member 2 includes a restriction post 27 which is located adjacent to the tongue 111 and moveably, along the front-to-back direction, received protectively within a corresponding restriction groove 127 formed in the second housing 12 and adjacent to the receiving space 121.

What is claimed is:

1. A plug connector comprising:
   a housing module having a mating end and including:
      a first housing; and
      a second housing assembled with the first housing to define a cavity therebetween; and
   a mating board received in the cavity and exposed to an exterior at a position close to the mating end; wherein
   the first housing has a main portion and a tongue unitarily extending from the main portion, the second housing has a receiving space receiving the tongue, and the tongue is deformed to latch within the receiving space;
   the tongue comprises a base portion and a pair of legs apart from each other and extending from the base portion into the receiving space;
   the receiving space comprises a first part and a second part, a distance between a pair of opposite edges of the first part being shorter than a distance between a pair of opposite edges of the second part;
   the pair of legs are first inserted into the receiving space along a direction that is perpendicular to a mating direction and then are deformed so that a distance between the two legs in the first part is shorter than a distance between the two legs in the second part; and the pair of legs are deformed by inserting an exterior tool between the two legs and pressing the two legs against the edges of the second part of the receiving space.

2. The plug connector of claim 1, wherein the housing module comprises a screw disposed near the mating end to assemble the first housing with the second housing together, and the tongue is disposed near an end of the housing module opposite to the mating end.

3. The plug connector of claim 1, further comprising an unlocking member having a body portion, a pair of extending portions extending from two opposite ends of the body portion, and a tail portion connected with the two extending portions, each of the extending portions having a protuberance at an end thereof, and wherein the housing module comprises a stage disposed thereon close to the protuberance.

4. The plug connector of claim 3, wherein the housing module comprises a receiving space having a front wall and a rear wall opposite to the front wall, and a spring received in the receiving space.

5. The plug connector of claim 4, wherein the housing module comprises a guide block disposed thereon, and the extending portion has a guide rail for limiting a movement of the guide block.

6. A plug connector comprising:
   a housing module having a mating end along a front-to-back direction, and including:
      a first housing including a main portion and a tongue unitarily extending from the main portion; and
      a second housing forming a receiving space and assembled with the first housing in a vertical direction perpendicular to the front-to-back direction to define a cavity therebetween in the vertical direction; and
   a printed circuit board received in the cavity; wherein
   said receiving space is configured to allow the tongue to be inserted therein during assembling initially, and successively to allow the tongue to be outwardly deformed so as to prevent the tongue from leaving the receiving space backwardly once assembled;
   said receiving space defines a divergent configuration with two opposite edges thereof, and the deformed tongue includes two legs intimately and compliantly seated upon said two opposite edges, respectively; and
   the two legs are deformed away from each other in the front-to-back direction.

7. The plug connector as claimed in claim 6, wherein said receiving space is exposed to an exterior sidewardly.

8. The plug connector as claimed in claim 6, wherein each of said first housing and said second housing has various thicknesses thereof not only for complying with an exterior contour but also reinforcing strength thereof.

9. The plug connector as claimed in claim 8, further including an unlocking member moveable along the front-to-back direction, wherein said unlocking member includes a restricting post adjacent to the tongue, and the second housing forms a restricting groove adjacent to the receiving space to protectively receiving said restricting post therein.

10. The plug connector as claimed in claim 7, wherein said printed circuit board has a front end exposed within the mating end.

11. A plug connector comprising:
    a housing module having a mating end along a front-to-back direction, the housing module including:
       a first housing including a main portion and a tongue unitarily extending from the main portion; and a second housing forming a receiving space and assembled with the first housing in a vertical direction perpendicular to the front-to-back direction to define a cavity therebetween in the vertical direction; and a printed circuit board received in the cavity; wherein the housing module is metallic;

the receiving space is exposed to an exterior sidewardly; and the tongue has two legs deformed respectively in opposite directions along the front-to-back direction so as to prevent the tongue from leaving the receiving space.

\* \* \* \* \*